Figure 1:
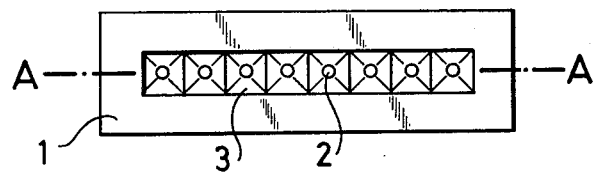

United States Patent [19]
Albert et al.

[11] 3,920,876
[45] Nov. 18, 1975

[54] PROCESS FOR THE MANUFACTURE OF SHAPED BODIES FROM CELLULAR THERMOPLASTIC MATERIALS

[75] Inventors: Walter Albert, Frankfurt am Main; Hans-Otto Schiedrum, Eppstein, Taunus; Heinrich Tacheci, Bad Homburg, all of Germany

[73] Assignee: Hoechst Aktiengesellschaft, Frankfurt (Main), Germany

[22] Filed: May 15, 1973

[21] Appl. No.: 360,459

[30] Foreign Application Priority Data
May 19, 1972 Germany............................ 2224460

[52] U.S. Cl. ............... 428/295; 156/244; 156/500; 264/45.1; 264/45.8; 264/45.9; 264/46.1; 425/464; 425/466
[51] Int. Cl.² ..................... B32B 5/02; B29D 27/00
[58] Field of Search ............ 156/244, 500; 161/143, 161/170, 172, 178; 264/45, 46, 47, 51, 53, 54; 425/461, 463, 464, 465, 466, 467

[56] References Cited
UNITED STATES PATENTS

| | | | |
|---|---|---|---|
| 1,874,503 | 8/1932 | Greenwood | 425/463 |
| 2,026,740 | 1/1936 | Kinsella et al. | 425/466 |
| 2,734,224 | 2/1956 | Winstead | 425/461 |
| 2,804,645 | 9/1957 | Wilfony | 425/464 |
| 3,607,596 | 9/1971 | Fairbanks | 156/500 |
| 3,720,572 | 3/1973 | Soda et al. | 156/244 |

*Primary Examiner*—Caleb Weston
*Attorney, Agent, or Firm*—Curtis, Morris & Safford

[57] ABSTRACT

A process for the manufacture of profiles of cellular thermoplastic material and a device for carrying out this process. This improved process comprises pressing the thermoplastic material containing a blowing agent through a multiple orificed die plate, the orifices of which enlarge in the direction of the material flow, in such a way that they unite at the latest at the outlet side of the die plate. This process ensures excellent welding of the individual elongated elements issuing from the orifices of the die plate.

4 Claims, 7 Drawing Figures

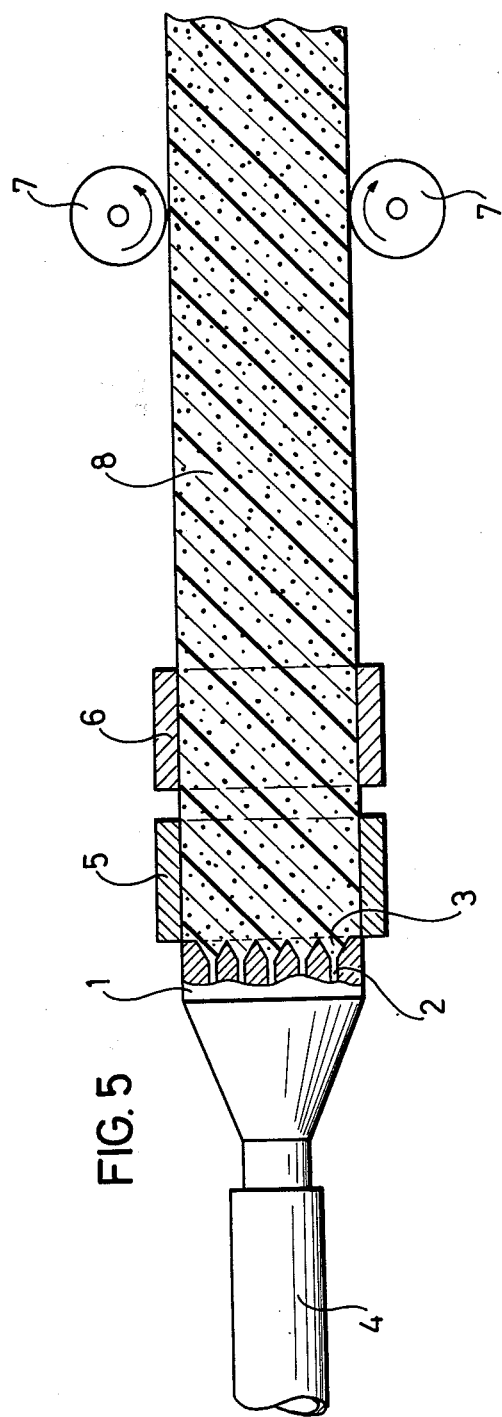

PROCESS FOR THE MANUFACTURE OF SHAPED BODIES FROM CELLULAR THERMOPLASTIC MATERIALS

The present invention relates to an improved process for the manufacture of profiles of cellular thermoplastic products.

It has been proposed to extrude thermoplastic materials containing a blowing agent through a slot die to obtain plate-shaped bodies. In the foaming process, however, the plates obtained do not have exact external dimensions and a smooth surface. Rather they are more or less wavy. By reducing the flow of the material at certain points in the slot of the die, for example by diminishing in certain places the breadth of the slot or by installing displacement means, the waves may be partially compensated, but on pressing the plates having a non-uniform thickness in the following former, plates with irregular density distribution are obtained.

According to another known process the material issuing from the slot is allowed to foam between two plates. As soon as the foam has reached the thickness defined by the distance between the plates, a certain counter pressure is built up and the material flows broadwise. By this process plane plates are obtained, but it is difficult to produce plates which have a breadth of more than 600 mm and a thickness of more than 200 mm.

A further known process uses a multiple orificed die plate. In the foaming process the elongated elements issuing from the individual orifices of the die plate are united in an adjacent former in such a manner that a coherent plate is formed. Welding of the individual elongated foamed elements with one another is, however, so poor that the plate obtained does not have a satisfactory mechanical strength.

It has been found that an excellent welding of the elongated elements can be achieved by using a multiple orificed die plate with the orifices enlarging, preferably conically, towards the outlet side of the material so that they form a single coherent opening at the latest at the outlet surface of the orificed die plate. Due to this special construction of the orificed die plate, foaming of the individual elongated elements commences in the enlarging orifices so that the said elements unite in the orificed die plate or directly at its exit and are welded to a profile.

The present invention thus provides a process for the manufacture of profiles, preferably plates or boards, of cellular plastic materials wherein a thermoplastic material containing a blowing agent is pressed through a multiple orificed die plate into a former. The process comprises pressing the thermoplastic material containing a blowing agent through a multiple orificed die plate with the orifices enlarging, preferably conically, in the direction of the material flow, starting the foaming of the individual elongated elements already in the orifices of the die plate, uniting the elongated elements at the latest at the exit of the die plate and welding them to a single profile.

The device for the manufacture, according to the invention, of profiles, for example plates, of cellular material from thermoplastic material containing a blowing agent, includes an extruder, a multiple orificed die plate, a shaping die, a former and a draw-off device, wherein the orifices of the die plate enlarge, preferably conically, in the direction of the material flow and unite to a single coherent opening at the latest at the outlet of the die plate.

The plastic material in the extruder is kept under pressure by the resistance of the die plate and is thus prevented from foaming. The pressure in the material drops when it passes through the perforated plate and thus it can foam in the enlarging sections of the orifices. When the individual elongated and partially foamed elements flow together the heat content of the material is still sufficiently high to bring about complete welding to a single profile. As the elongated elements do not foam against air, a skin which would impede the welding is not formed. The material is then passed through the connected heatable shaping die in which welding and foaming are completed and the exact shape is conferred upon the profile.

The shaping die is followed by a former capable of being cooled in which the plate or the profile, i.e. the surface thereof, is cooled if cooling has not yet taken place to a sufficient degree according to the heat absorbed by the evaporating blowing agent. If necessary, cooling baths are provided for. Finally, the plate or profile is withdrawn by a draw-off device.

The unit weight of the structure of cellular material obtained substantially depends on harmonizing the cross section of the orifices (at their narrowest place) with the cross section of the shaping die and the draw-off speed. An enlargement of the passage cross section (sum of the cross sections of the orifices in their narrowest place) of the orificed die plate increases the density of the shaped article, while an enlargement of the cross section of the shaping die and an increase in the take off rate reduces the density of the shaped article. The combined single opening of the orificed die plate at the outlet side of the material preferably has a cross section which is similar to but smaller than that of the shaping die. Alternatively, the material can be foamed in the orificed die plate to the final size of the shaped structure. With a given shaping die and former the density of the shaped structure can be varied by exchanging the orificed die plate or modifying the take off rate.

The surface quality of the cellular shaped body and the thickness of the outer skin are influenced by the length of the former and the extent of cooling.

The orifices of the die plate and their enlargements towards the outlet side of the material may have any desired cross section, for example they may be quadratic, polygonal, round, or oval. The orifices may be arranged in one row or, when thicker boards are to be produced, preferably in several rows one above the other. The enlargements are preferably conical, but they may also have the shape of a hemisphere or a paraboloid, or another shape with curved surface.

Figure 1A:
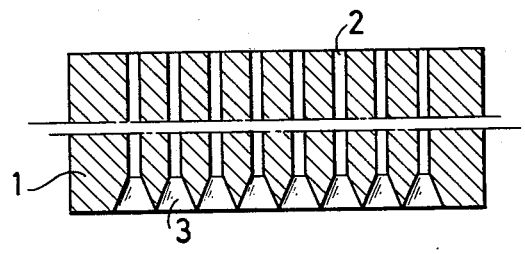
Figure 1B:
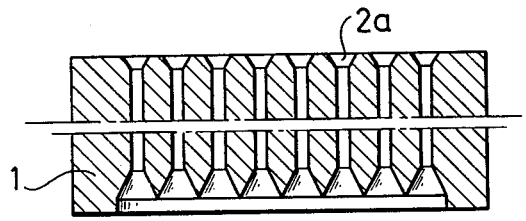
Figure 2:
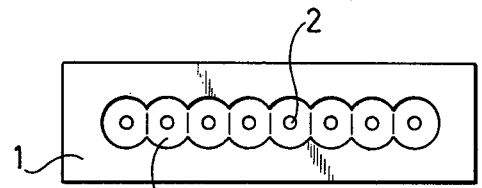
Figure 3:
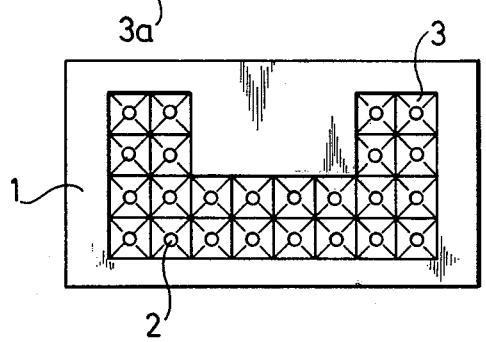
Figure 4:
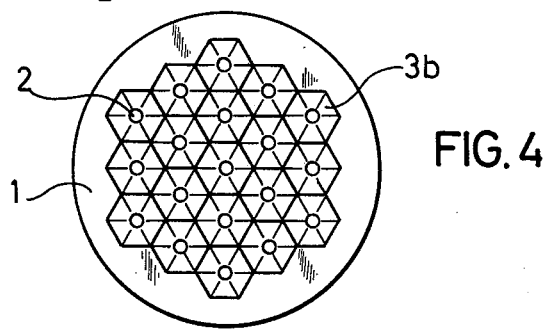

The invention will now be described with reference to the drawings wherein:

FIG. 1 is a front elevation of the exit end of a single row orificed die plate 1 wherein orifices 2 are conically enlarged to have a quadratic cross section 3;

FIG. 1a is a plan view in section taken along line A—A of FIG. 1;

FIG. 1b is a plan view in section of a further embodiment of the device of FIG. 1 wherein conically enlarged orifices having a quadratic cross section 3 unite shortly before the exit end of die plate 1 and wherein the orifices are also conically enlarged at end 2a opposite the direction of material flow;

FIG. 2 is a front elevation of the exit end of orificed die plate 1 having a single row of conically enlarged orifices 2 of circular cross section at the exit end;

FIG. 3 is a front elevation of the exit end of an orificed die plate 1 wherein two rows of conically enlarged orifices 2 are arranged in a U-shape and wherein the enlargements are of quadratic cross section 3;

FIG. 4 is a front elevation of the exit end of round orificed die plate 1 wherein conically enlarged orifices 2 are of hexagonal cross section 3b; and FIG. 5 is a side elevation schematically representing the individual elements of the device in accordance with the invention.

In the drawings numeral 1 designates the orificed die plate having orifices 2 at the exit end for the material (in the case of a conical enlargement of the orifice at the inlet end this is designated by numeral 2a) and 3, 3a, and 3b are the enlargements of the orifices at the end of the die plate from which the material exits.

In FIG. 5 numeral 4 designates the material outlet of the extruder, numeral 5 designates the shaping die, which is a slot die firmly connected with the perforated plate 1 having five rows of orifices one above the other, numeral 6 represents the former, 7 indicates the take off device and numeral 8 represents the extruded plate of cellular material.

FIGS. 1 to 4 illustrate by way of example favorable arrangements and cross sections of the enlargements of the orifices for the manufacture of plates or boards or other profiles. In the manufacture of profiles the orifices in the orificed die plate are arranged in accordance with the desired cross section of the respective profile. In order to ensure a favorable flow of the material through the orificed die plate, it is expedient to enlarge the orifices conically also at the inlet side of the material. In principle, the enlargement of the orifices towards the exit of the material could start directly from the inlet side of the perforated plate, but it has proved more expedient, above all for the building up of a sufficient counter pressure, and for obtaining a uniform and smooth flow of the material, to have the orifices run parallel to each other over a certain distance without enlargement and thereafter to start the enlargement towards the exit side of the material as shown in FIGS 1a and 1b.

Suitable plastic materials in the process of the invention are practically all thermoplastics. Polystyrene, rubber-modified impact resistant polystyrene or copolymers of styrene with up to 30% by weight, preferably up to 20% by weight, of comonomers, for example methylstyrene and/or acrylonitrile, polyolefins, for example polyethylene, polypropylene or copolymers of ethylene or propylene with one another or with their higher homologs, polyvinyl chloride or vinyl chloride copolymers, or polymer mixtures containing preponderant proportions of the aforesaid polymers are preferred.

As the blowing agent, physical blowing agents such as hydrocarbons, for example pentane or propane; halogenated hydrocarbons, for example methyl chloride or dichlorodifluoromethane; or gases, for example nitrogen or carbon dioxide, as well as chemical blowing agents, preferably azodicarbonamide, are used. The blowing agent may be contained in the starting granules or it may be added to the polymer melt in the extruder. In the latter case a tandem unit is preferably used, i.e. a unit with two extruders connected in series.

Besides the blowing agent or mixture of blowing agents, the plastic material may contain further additives, for example pore regulators, fillers, stabilizers, antistatic agents, dyestuffs, fire retarding agents, or lubricants.

In the process of the invention the individual elongated foamed material elements fuse together perfectly, and all advantages resulting from the use of an orificed die plate are maintained, especially the exact control of the material flow. The plates, boards or other profiles obtained have exact dimensions, a good surface quality and uniform density (unit weight). Even the manufacture of very large and thick structures does not present difficulties.

The following examples illustrate the invention.

EXAMPLE 1

Granular polystyrene was melted at about 220°C in a single screw extruder (60 mm). The granules had previously been coated in a rolling drum with 0.3% by weight of citric acid and 0.4% by weight of sodium bicarbonate as pore regulators. With the aid of a dosing pump 12% by weight of dichlorodifluoromethane, calculated on the polystyrene used, were forced into the melt through an inlet opening in the extruder. In the extruder the polystyrene was intimately mixed with the blowing agent.

Over a pressure conduit the mixture was transferred into a second extruder (90 mm) provided with effective cooling zones wherein the mass temperature was reduced to about 105°C. The extruder conveyed the mass over a distributing channel to the multiple orificed die plate having a thickness of 25 mm and provided with a row of 8 orifices slightly enlarged conically towards the inlet side of the material and enlarged in their cross section towards the outlet side of the material. The diameter at the narrowest place of the orifices was 2 mm. In a manner similar to that represented in FIG. 1, the enlargements had a rectangular (instead of quadratic) cross section and at the exit side of the orificed die plate they formed a single opening of rectangular shape of 110 × 10 mm.

On passing through the orifices the material started foaming and the individual elongated elements fused together seamlessly at the outlet side. The partially foamed material was passed through a slot die heated at about 60°C and having a cross section of 220 × 50 mm and a length of 300 mm wherein foaming was completed and the cellular material acquired its final shape. By the evaporation of the blowing agent so much heat was extracted from the mass that the plate was substantially stable as to shape. In a following cooled former the surface of the plate was further cooled.

The place was drawn off at a rate of 2 m/minute. It had exact dimensions, a good strength and a uniform unit weight of 44 g/l. The output was 58 kg/hour.

EXAMPLE 2

As in Example 1, a tandem unit was used. The first extruder had a screw diameter of 114 mm, the second of 152 mm. A combination of a multiple orificed die plate having a thickness of 60 mm provided with 1,200 orifices, each having a diameter of 2 mm at the narrowest place, with a slot die having a cross section of 600 × 200 mm was used. The length of the slot die was 200 mm. The 1,200 orifices of the die plate were arranged in 20 rows one above the other, they were slightly enlarged conically towards the inlet side of the material and their cross sections increased towards the outlet side of the material so that the total issuing area had a size of 600 × 200 mm.

The slot die was followed by a cooled former having a cross section of 600 × 200 mm.

The first extruder was charged with granular polystyrene to which 0.4% by weight of citric acid and 0.5% by weight of sodium bicarbonate were added as pore regulators. As blowing agent 12% by weight, calculated on the polystyrene used, of a mixture of dichlorodifluoromethane and methyl chloride in a weight ratio of 1:1 were pumped into the first extruder.

The plate was drawn off at a rate of about 0.9 m/minute. It had a unit weight of 36 g/liter. The output amounted to 225 kg/hour.

What is claimed is:

1. In a process for the manufacture of a shaped body of a cellular material by pressing a thermoplastic material containing a blowing agent through a multiple-orificed die plate into a shaping die, the improvement which comprises pressing said thermoplastic material containing a blowing agent through a multiple-orificed die plate having orifices which enlarge in the direction of material flow, whereby a plurality of individual elongated elements of the thermoplastic material are formed and foaming of the individual elongated elements starts in the enlargements of the orifices, uniting the elongated elements at the latest at their exit from the multiple-orificed die plate, and passing the united elongated elements through a shaping die having a cross-sectional area which is at least as great as the cross-sectional area of the multiple-orificed die plate.

2. The process of claim 1, wherein the thermoplastic material is polystyrene or a copolymer of styrene.

3. A shaped body of cellular thermoplastic material made according to claim 1.

4. A shaped body as in claim 3 which is a plate or board.

* * * * *